United States Patent [19]

Stehlin et al.

[11] Patent Number: 5,709,810

[45] Date of Patent: *Jan. 20, 1998

[54] MERCERIZATION WETTING AGENT COMPOSITIONS

[75] Inventors: Albert Stehlin, Rosenau, France; Thomas Maier, Schliengen, Germany

[73] Assignee: Ciba Specialty Chemicals Corporation, Tarrytown, N.Y.

[*] Notice: The term of this patent shall not extend beyond the expiration date of Pat. No. 5,464,547.

[21] Appl. No.: 567,614

[22] Filed: Dec. 5, 1995

[30] Foreign Application Priority Data

Dec. 8, 1994 [CH] Switzerland ............... 3725/94

[51] Int. Cl.⁶ ............... D06M 13/256; D06M 13/328
[52] U.S. Cl. ............... 252/8.81; 252/189; 252/192; 8/125
[58] Field of Search ............... 8/125, 115.64, 8/115.65, 115.69, 139; 252/8.8, 8.9, 8.6, 8.7, 8.75, 135, 525, 526, 530, 535, 544, 545, 554, 174.16, 174.17, 174.21, 8.81, 306, 307, 320, 321, 189, 192; 510/339, 341, 347, 350

[56] References Cited

U.S. PATENT DOCUMENTS

| | | | |
|---|---|---|---|
| 2,010,176 | 8/1935 | Brodersen | 8/127 |
| 4,844,710 | 7/1989 | Guth et al. | 8/127.1 |
| 5,013,327 | 5/1991 | Wahle et al. | 8/125 |
| 5,062,989 | 11/1991 | Kamegai et al. | 510/122 |
| 5,464,547 | 11/1995 | Stehlin et al. | |
| 5,494,486 | 2/1996 | Stehlin et al. | 8/125 |

FOREIGN PATENT DOCUMENTS 919424  1/1973  Canada.
0274350  7/1988  European Pat. Off..
0354344  2/1990  European Pat. Off..
2523962  9/1983  France.
2105557  8/1972  Germany.
57-56579  4/1982  Japan.
9222698  12/1992  WIPO.

OTHER PUBLICATIONS

Derwent Abstr. 84–229987, Jan. 1984.
Derwent Abstr. 94–032044, Dec. 1993.
Derwent Abstr. 72–53630T, Aug. 1972.

*Primary Examiner*—Alan Diamond
*Attorney, Agent, or Firm*—Kevin T. Mansfield

[57] ABSTRACT

Described are mercerization wetting agent compositions comprising (a) a compound of the formula

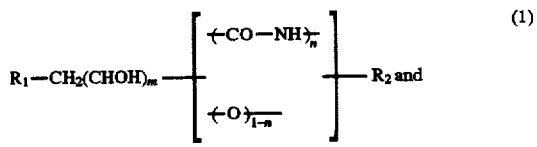

(1)

and (b) a phosphoric ester of the formula

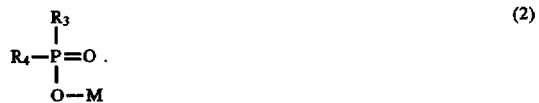

(2)

The mercerization wetting agent compositions of the invention are notable for good wetting power in a mercerizing bath.

4 Claims, No Drawings

MERCERIZATION WETTING AGENT COMPOSITIONS

The present invention relates to mercerization wetting agent compositions for cellulosic fibre materials, comprising carbohydrate-based compounds and phosphoric esters.

Mercerization is a customary step in the processing of cellulosic fibre materials and involves treating these materials with aqueous alkali metal hydroxide.

Mercerization wetting agents have to meet various application requirements. First, they should ensure adequate wetting in the strongly alkaline mercerizing liquors. Since in high-speed mercerizing machines the goods to be mercerized travel through the liquor at high speed, they have to be wetted within a shorter time than in slower machines. The higher speed through the liquor of the material to be mercerized is responsible for increased foam formation on the liquor, which, in yarn mercerization, for example, prevents not only rapid but also uniform wetting of the yarn. A further criterion for a good mercerization wetting agent is therefore the suppression of foaming in the mercerizing liquor. In addition, the formation of voluminous layers of foam also prevents the concentrating and recovery of the alkali metal hydroxide in the wash baths following the mercerizing bath.

EP-A-0,102,930 discloses mercerization wetting agents based on sulfuric esters of fatty alcohols, which give high-wetting and are also low-foaming in use. Unfortunately, these wetting agents are less advantageous from an ecological viewpoint, since they are only slow to biodegrade.

It has now been found that, surprisingly, compositions comprising carbohydrate-based compounds and certain phosphoric esters possess a good wetting effect combined with minimal foaming.

The present invention accordingly provides mercerization wetting agent compositions comprising (a) a compound of the formula

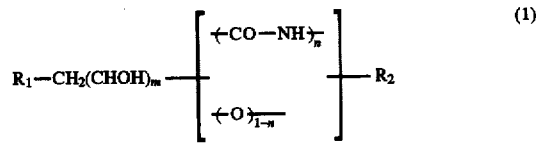

(1)

(b) a phosphoric ester of the formula

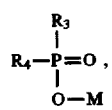

(2)

wherein
$R_1$ is hydroxyl or $SO_3M$,
$R_2$ is $C_4$–$C_{18}$alkyl,
$R_3$ is $C_1$–$C_{10}$alkoxy or a radical of the formula

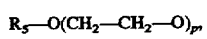 (2a)

$R_4$ is O—M or $R_3$,
$R_5$ is $C_1$–$C_{10}$alkyl,
M is hydrogen or an alkali metal ion,
m is from 2 to 6,
n is 1 or 0, and
p is from 1 to 8.

The present invention further provides the mercerizing liquors comprising the mercerization wetting agent compositions, a process for mercerizing cellulosic fibre materials, and a process for reducing foaming in the recovery of alkali metal hydroxide from mercerization wash baths.

The compounds of the formula (1) for use as component (a) are alkylglycosides (alkyl ether polyols) when the redial in the square brackets in the formula (1) is —O— (n=0) or alkylcarboxamidoglycosides (alkylglyconamides) when the radical in the square brackets in the formula (1) is —CO—NH— (n=1).

The alkylglycosides and alkylcarboxamidoglycosides used according to the present invention are compounds known per se, the preparation of which is described in numerous publications. For instance, the preparation of the alkylglycosides is described in, for example, U.S. Pat. No. 3,547,828, U.S. Pat. No. 3,727,269 and U.S. Pat. No. 3,839,318 and European Patent Applications EP-A-0,301, 298, EP-A-0,357,696 and EP-A-0,362,671. The reaction products described as alkylglycosides can be prepared from glycoses and alcohols of the formula $$R_2—OH \qquad (1a)$$

wherein
$R_2$ is $C_4$–$C_{18}$alkyl,
either by direct reaction with an excess of the alcohol and in the presence of an acid, for example hydrogen chloride, as catalyst or by transacetalization using a lower alcohol to serve both as solvent and as reactant.

The alkylglycosides used according to the present invention are for example reaction products of the glycoses glucose, fructose, mannose, galactose, talose, gulose, allose, altrose, isose, arabinose, xylose, lyxose and ribose and the corresponding $C_4$–$C_{18}$ alcohols, and the glycoses can be linked together in a glycosidic manner.

The alcohols used are advantageously straight-chain alcohols which are either produced synthetically or which, as fatty alcohols, are, as will be known, available from natural raw materials. Alcohols of natural origin include for example myristyl alcohol, cetyl alcohol, stearyl alcohol and oleyl alcohol. The synthetic alcohols are primarily alcohols derived from branched hydrocarbons, for example isobutyl alcohol, sec-butanol, tert-butanol, isoamyl alcohol, 2-ethylbutanol, 2-methylpentanol, 5-methyl-3-heptanol, 2-ethylhexanol, 1,1,3,3-tetramethylbutanol, 2-octanol, isononyl alcohol, trimethylhexanol, trimethylnonyl alcohol, n-decanol, $C_9$–$C_{11}$ oxo alcohol or hexadecyl alcohol. Of course, the alcohols can also be mixtures. Such mixtures can be derived in particular from the technical grade mixtures of straight-chain $C_4$–$C_{18}$ alcohols customary in fat chemistry.

The alkylglycosides used according to the present invention may still include small amounts, preferably below 2% by weight, of unconverted $C_4$–$C_{18}$ alcohols from their preparation, which, however, has no disadvantageous effect on their use as mercerization wetting agents.

Alkylcarboxamidoglycosides of the formula (1) to be used according to the present invention are known for example from FR-A-2,523,962. These compounds are prepared for example by reacting an aldonic acid of the formula

 (1b)

wherein
$R_1$ is hydroxyl or —$SO_3M$, and
m is from 2 to 6,
and which may be present in the form of a lactone, with an amine of the formula

 (1c)

wherein $R_2$ is $C_4$–$C_{18}$alkyl.

The carboxyl group of the aldonic acid can be activated by means of a carbodiimide, for example dicyclohexylcarbodiimide, in an organic solvent. If desired, hydroxybenzotriazole can be used as catalyst. The aldonic acids are used in the preparation of the glycosides (glyconamides) to be used according to the present invention in the form of their alkali metal salts, for example as sodium or potassium salts.

The aldonic acids of the formula (1b) are prepared in a conventional manner by oxidation, for example electrochemical oxidation of the corresponding monosaccharides. Examples of suitable aldonic acids of the formula (1b) include gluconic acid, mannonic acid, galactonic acid, lyxonic acid, arabonic acid, xylonic acid, ribon acid, glucoheptonic acid and glucooctonic acid. Suitable for use as amines for preparing the alkylamidoglycosides of the general formula (1) are for example n-octylamine, tert-octylamine, decylamine, dodecylamine, laurylamine, tetradecylamine, or miristylamine, hexadecylamine or palmitylamine, and also octadecylamine or stearylamine.

Preferably the mercerization wetting agent compositions usable according to the present invention include at least one alkylcarboxamidoglycoside compound of the formula

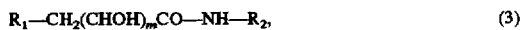

$$R_1\text{—}CH_2(CHOH)_m CO\text{—}NH\text{—}R_2, \quad (3)$$

wherein $R_1$ is hydroxyl or —$SO_3M$, $R_2$ is $C_4$–$C_{10}$alkyl,

M is an alkali metal, and m is from 2 to 6, and very particularly a compound of the formula (3) wherein $R_2$ is $C_6$–$C_8$alkyl.

Very particular preference is given to mercerization wetting agent compositions including a compound of the formula (3) wherein m is from 2 to 4.

An alkylglycoside compound present in the mercerization wetting agent compositions of the present invention is preferably a compound of the formula $$R_1\text{—}CH_2(CHOH)_m O\text{—}R_2, \quad (4)$$

wherein $R_1$ is hydroxyl or —$SO_3M$, $R_2$ is $C_6$–$C_{10}$alkyl,

M is an alkali metal, and m is from 2 to 6.

Of these compounds, preference is in turn given to those where m is from 2 to 4.

The compounds of the formula (1) are used in the mercerization wetting agent compositions of the present invention not only as individual compounds but also as mixtures. Preferred mixtures comprise compounds of the formulae

$$NaSO_3\text{—}CH_2(CHOH)_{m_1}\text{—}OR_2 \quad (5)$$

and

$$OH\text{—}CH_2(CHOH)_{m_2}\text{—}O\text{—}R_6 \quad (6)$$

wherein $R_2$ is $C_6$–$C_{10}$alkyl, $R_6$ is $C_4$–$C_8$alkyl, and $m_1$ and $m_2$ are independently of each other from 2 to 4.

The compound of the formula (6) is butylglycoside, in particular.

The mixing ratio of the compounds of the formula (5) and of the formula (6) is within the range from 9:1 to 1:1, preferably from 8:2 to 6:4.

In the formula (2), $C_1$–$C_{10}$alkyl and $C_1$–$C_{10}$alkoxy denote straight-chain or branched alkyl and alkoxy radicals, respectively, for example methyl, ethyl, n-propyl, isopropyl, n-butyl, sec-butyl, tert-butyl, amyl, isoamyl or tert-amyl, heptyl, octyl, isooctyl, nonyl, decyl, on the one hand, and methoxy, ethoxy, propoxy, butoxy, pentyloxy, hexyloxy, heptyloxy, octyloxy, isooctyloxy, nonyloxy or decyloxy, on the other.

The compounds of the formula (2) for use as component (b) are mono- or dialkyl esters of orthophosphoric acid. The compounds are obtained in a conventional manner, for example by reacting the corresponding $C_1$–$C_{10}$ fatty alcohols with phosphorous pentoxide. The products are used in the form of acid esters, but usually in the form of their alkali metal salts, in particular their sodium or potassium salts. Phosphoric esters of the formula (2) used according to the present invention wherein $R_4$ and/or $R_3$ are each a radical of the formula (2a) are prepared for example by reacting phosphorous pentoxide with the corresponding ethoxylated $C_1$–$C_{10}$ fatty alcohols.

Preferably the mercerization wetting agent compositions of the present invention include as component (b) phosphoric esters of the formula (2) wherein $R_3$ is $C_3$–$C_8$alkoxy, and $R_4$ is $C_3$–$C_8$alkoxy or —O—M.

Very particular preference is given to phosphoric esters of the formula (2) wherein $R_3$ is $C_4$–$C_6$alkoxy, and $R_4$ is $C_4$–$C_6$alkoxy or —O—M.

Preference is further given to phosphoric esters of the formula (2) wherein $R_3$ is a radical of the formula (2a), $R_4$ is a radical of the formula (2a) or —OM, $R_5$ is $C_4$–$C_6$alkyl, and p is from 1 to 4.

In each case M is as defined in the formula (2).

Of particular interest are mercerization wetting agent compositions comprising (a) an alkylcarboxamidoglycoside compound of the formula

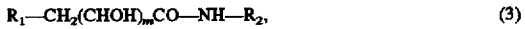

$$R_1\text{—}CH_2(CHOH)_m CO\text{—}NH\text{—}R_2, \quad (3)$$

and (b) a compound of the formula (2)

wherein $R_1$ is hydroxyl or —$SO_3M$, $R_2$ is $C_6$–$C_8$alkyl,

M is an alkali metal, m is from 2 to 6; and $R_3$ is $C_4$–$C_6$alkoxy, and $R_4$ is $C_4$–$C_6$alkoxy or —O—M.

The mixing ratio of components (a) and (b) can be selected within a relatively wide range. The optimal ratio between components (a) and (b) is within the range from 8:2 to 0.5:9.5, for example. Particularly advantageous mercerization effects are obtained with a mixing ratio of from 6:4 to 1:9.

The mercerization wetting agent compositions of the present invention preferably include 10 to 30% by weight of component (a), and 50 to 70% by weight of component (b).

The mercerization wetting agent compositions of the present invention are prepared in a conventional manner by initially charging individual component (b). Then 50% KOH is added with stirring until a pH of about 2.5 is obtained, and then the component (a) is added. This is a purely physical process. There is no chemical reaction between the individual components.

The merization wetting agent compositions used according to the present invention are preferably used in the form of an aqueous solution. For this purpose, 1 to 20, preferably 2.5 to 10, g of the aqueous composition are used per liter of the mercerizing liquor.

Mercerized cellulose fibres have a higher lustre, for example. Also their dye affinity and breaking strength are improved. In mercerization, the fibres are treated with concentrated alkali metal hydroxide solutions having a concentration of about 22 to 28%, for example aqueous solutions of lithium, sodium or potassium hydroxide or mixtures thereof. In this case, the fibers are simultaneously subjected to stretching so as to achieve a further increase in the lustre effect. The most frequently employed variant is cold mercerization (in contradistinction to hot mercerization, which is carried out at a bath temperature of 20°–80° C.). In cold mercerization, the bath temperature is from about −20° to +20° C. Special effects, for example transparency effects, can be obtained on using baths cooled down to −20° C. Preferably, however, the temperature is 5° to 20° C. Depending on whether the fibres are mercerized in the dry, prescoured or prewetted state, the mercerization is known as dry or wet mercerization. Especially the variant of dry mercerization understandably makes the use of highly effective mercerization wetting agents necessary.

A further positive mercerization property of the mercerization wetting agent compositions of the present invention is their ability to bind iron ions present in the alkali metal hydroxide solutions of the mercerizing liquors. The mercerization wetting agent compositions of the present invention have a high iron-binding capacity, which has the advantage that the additional use of appropriate complexing agents in the mercerizing liquor can be dispensed with.

Suitable cellulosic fibre materials are in particular cotton and blend fabrics with regenerated celluloses, such as staple viscose and filament viscose. However, the mercerization of blend fabrics composed of native celluloses (e.g. cotton and also hemp and flax) and regenerated celluloses places high demands on the concentration and composition of the mercerizing liquors owing to the opposing properties of these components. This is why blend fabrics are almost exclusively mercerized dry, thereby avoiding an additional (critical) contact of the blend fabrics with scouring or wetting baths.

In industry, mercerization is carded out as yarn or piece mercerization. A detailed description of these process variants and also of mercerization in general is given for example in Lindner, Textilhilfsmittel und Waschrohstoffe, Wissenschaftliche Verlagsgesellschaft, Stuttgart, 1964, Volume 2, pages 1474 ff.

However, mercerization wetting agent compositions of the present invention also permit a rapid and trouble-free recovery of the alkali metal hydroxide from the wash baths following the mercerizing bath. Distillative removal of the water from these baths has the effect of concentrating the alkali metal hydroxide present in the mercerizing bath. In this process, the mercerizing wetting agent compositions have only a very minimal tendency to foam. The concentrated alkali metal hydroxide solution obtained can then be re-used in the mercerizing bath.

The Examples which follow illustrate the invention without limiting it thereto. Parts and percentages are by weight, unless otherwise stated.

EXAMPLE 1

Preparation of Novel Mercerization Wetting Agent Composition

In a stirred glass beaker
140 g of n-butyl phosphate are mixed with
80.0 g of 50% potassium hydroxide solution and then
40.0 g of the compound of the formula

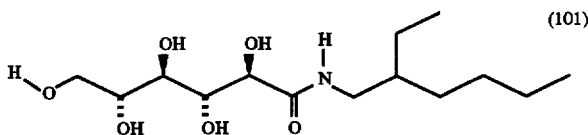

are dissolved therein.

The formulation obtained is a clear, thick, yellowish solution.

EXAMPLE 2

This example is concerned with determining the shrinkage capacity of cotton in mercerizing baths in accordance with German Standard Specification DIN 53987. The shrinkage capacity is by definition the time which is required to shrink the cotton yarn immersed in the mercerizing liquor by a certain proportion of its original length. For this, a skein of scoured raw cotton yarn (weight: 1 g; length: 24 cm) to which a weight of 33 g has been attached is dipped into a glass cylinder filled with the alkaline mercerizing liquor. The time is measured for the skein to shrink by 20% in the alkali metal hydroxide solution containing 23.5 g of 100% NaOH in 100 g of liquor. The wetting agent concentration is 6 g/l. The results are reported in Table 1.

TABLE 1

| | | | Shrinkage capacity | | |
|---|---|---|---|---|---|
| Component (a) | Component (b) | (a):(b) | 10% [s] | 20% [s] | Total*) [%] |
| Compound of formula (101) | n-Butyl phosphate | 60:40 | 3 | 5 | 35.6 |
| Compound of formula (101) | n-Butyl phosphate | 40:60 | 3 | 5 | 35.6 |
| Compound of formula (101) | n-Butyl phosphate | 20:80 | 3 | 5 | 35.6 |
| Compound of formula (101) | n-Butyl phosphate | 10:90 | 3.5 | 5.5 | 35.8 |

*)Total shrinkage measured after an immersion time of 2 minutes; the value indicates the shrinkage (in %) compared with the original length of the tested cotton yarn The results show that the mercerization wetting agent compositions of the present invention possess good mercerization wetting power, since effective shrinkage values are obtained after a very brief immersion.

What is claimed is:

1. A mercerization wetting agent composition comprising (a) a compound of the formula $$R_1—CH_2(CHOH)_m CO—NH—R_2, \qquad (3)$$

wherein $R_1$ is hydroxyl or —$SO_3M$, and M is an alkali metal ion $R_2$ is $C_4$–$C_{10}$alkyl and
m is from 2 to 6 and
(b) a phosphoric ester of the formula

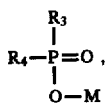 (2)

wherein
 $R_3$ is $C_4$–$C_6$-alkoxy; and
 $R_4$ is O—M or $C_4$–$C_6$alkoxy.
2. A mercerization wetting agent composition according to claim 1, wherein
 $R_2$ is $C_6$–$C_8$alkyl in the formula (3).

3. A mercerization wetting agent composition according to claim 1, wherein (a) and (b) are present in a weight ratio of from 8:2 to 0.5 to 9.5 of (a) to (b).

4. A mercerization wetting agent composition according to claim 1, comprising 10 to 30% by weight of said (a), and 50 to 70% by weight of said (b), and further comprising water.

* * * * *